Dec. 24, 1963  W. E. BROWN  3,115,328
SEAT POSITIONING MECHANISM
Filed Nov. 4, 1957  3 Sheets-Sheet 1

INVENTOR
William E. Brown
BY
W. S. Pettigrew
ATTORNEY

Dec. 24, 1963   W. E. BROWN   3,115,328
SEAT POSITIONING MECHANISM
Filed Nov. 4, 1957   3 Sheets-Sheet 2

Fig. 4

INVENTOR.
William E. Brown
BY W. F. Pettigrew
ATTORNEY

Dec. 24, 1963   W. E. BROWN   3,115,328
SEAT POSITIONING MECHANISM
Filed Nov. 4, 1957   3 Sheets-Sheet 3

Fig. 5

INVENTOR.
William E. Brown
BY
W. S. Pettigrew
ATTORNEY

United States Patent Office

3,115,328
Patented Dec. 24, 1963

3,115,328
SEAT POSITIONING MECHANISM
William E. Brown, Anderson, Ind., assignor to General Motors Corporation, Detroit, Mich., a corporation of Delaware
Filed Nov. 4, 1957, Ser. No. 694,289
13 Claims. (Cl. 248—429)

This invention relates to seat positioning mechanisms and more particularly to vehicle seat positioning mechanisms which facilitate exit and entrance of the vehicle driver and passengers.

The seat positioning mechanism of this invention is intended primarily for use in vehicle bodies having a manually controlled power operated horizontally movable front seat and has various embodiments depending on the particular predetermined conditions to which it is responsive and the particular body styles in which it is used, whether two door or four door body styles. In general, the mechanism is operative in response to certain predetermined conditions to cause the vehicle front seat to be moved either horizontally, forwardly or rearwardly from its manually selected or initial starting position to a predetermined limit position to facilitate driver and passenger ingress and egress. In addition, the mechanism is also operative in response to certain predetermined conditions to cause the seat to be returned from the predetermined limit position to its manually selected or initial starting position.

Although the mechanism has various embodiments, it includes a seat control unit which can be used with equal success in each embodiment of the invention and can therefore be mass produced. The seat control unit generally includes first means defining or corresponding to the manually selected seat position, and second means for operating the first means and adjustable with respect to the first means upon movement of the seat from one manually selected position to another manually selected position.

In one embodiment of the invention the seat positioning mechanism is intended for use in two door vehicle body styles having a manually controlled electrically operable horizontally movable front seat. The seat positioning mechanism is interconnected with the vehicle ignition switch, the gear shift lever or other transmission control means, and with the tiltable front seat back or backs. When the ignition switch is "off," the seat positioning mechanism causes the seat to be moved rearwardly from its manually selected or initial starting position to a rear limit position. When the ignition switch is subsequently turned "on," the seat positioning mechanism causes the seat to be returned to its manually selected or initial starting position. When the ignition switch is "off" and the gear shift lever or other transmission control means is in park or neutral position, tilting movement of the front seat back or backs causes the seat to be moved forwardly from its manually selected or initial starting position to a forward limit position and restoration of the seat back or backs to normal upright position causes the seat to be moved from its forward limit position to its rear limit position. When the ignition switch is "on" and the gear shift lever or other transmission control means is in park or neutral position, tilting of the front seat back or backs causes the front seat to be moved forwardly from its manually selected or initial starting position to its forward limit position and restoration of the seat back or backs to normal upright position causes the seat to be moved from its forward limit position to its rear limit position and then to its manually selected or initial starting position.

In a second embodiment of the invention the seat positioning mechanism is intended for use in four door vehicle body styles having a manually controlled electrically operable horizontally movable front seat. The seat positioning mechanism is interconnected with the vehicle ignition switch such that the seat is moved to its rear limit position for easy exit and entrance when the ignition switch is turned "off" and is returned to its manually selected or initial starting position when the ignition switch is subsequently turned "on."

In both embodiments of the invention, the manually operated seat control switch provides an override at all times to any movement of the seat under control of the seat positioning mechanism. Thus the driver has full control over movement of the seat at all times regardless of whether the seat is stationary when the switch is operated or is being moved under control of the seat positioning mechanism. Additionally, a manually operated cut-off switch is provided to stop any movement of the seat under control of the seat positioning mechanism and yet allow full operation of the seat under control of the manually operated seat control switch.

The primary object of this invention is to provide a new and improved seat positioning mechanism. Another object of this invention is to provide a new and improved vehicle seat positioning mechanism which facilitates exit and entrance of the vehicle driver and passengers. A further object of this invention is to provide a new and improved vehicle seat positioning mechanism for use in either two door or four door vehicle body types which include a power operated horizontally movable front seat. Yet another object of this invention is to provide a new and improved vehicle seat positioning mechanism which includes a seat control unit having means defining or corresponding to the manually selected seat position and means for operating the first means and adjustable with respect thereto upon movement of the seat from one manually selected position to another manually selected position.

These and other objectives of this invention will be readily apparent from the following specification and drawings, wherein.

Figure 1:
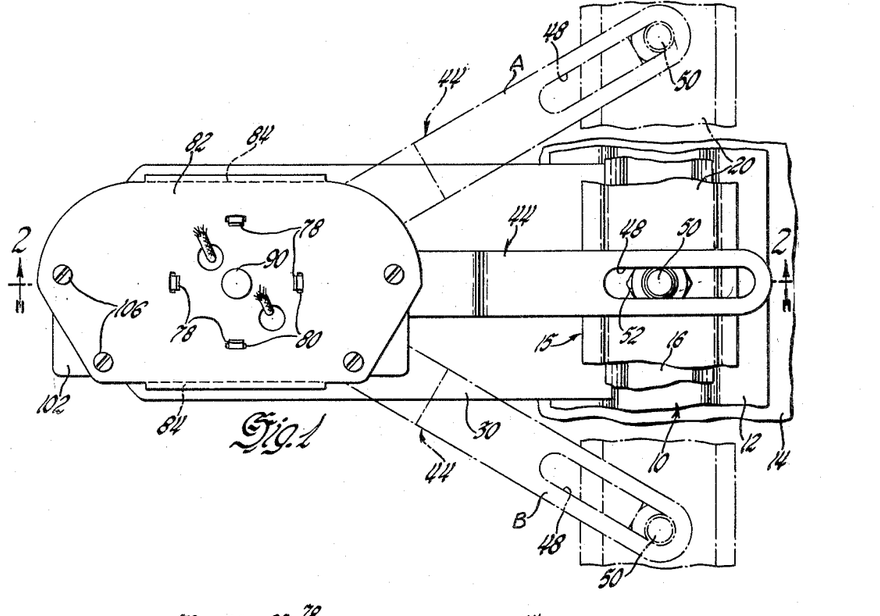
FIGURE 1 is a top plan view of a seat control unit according to this invention.
Figures 2, 3:
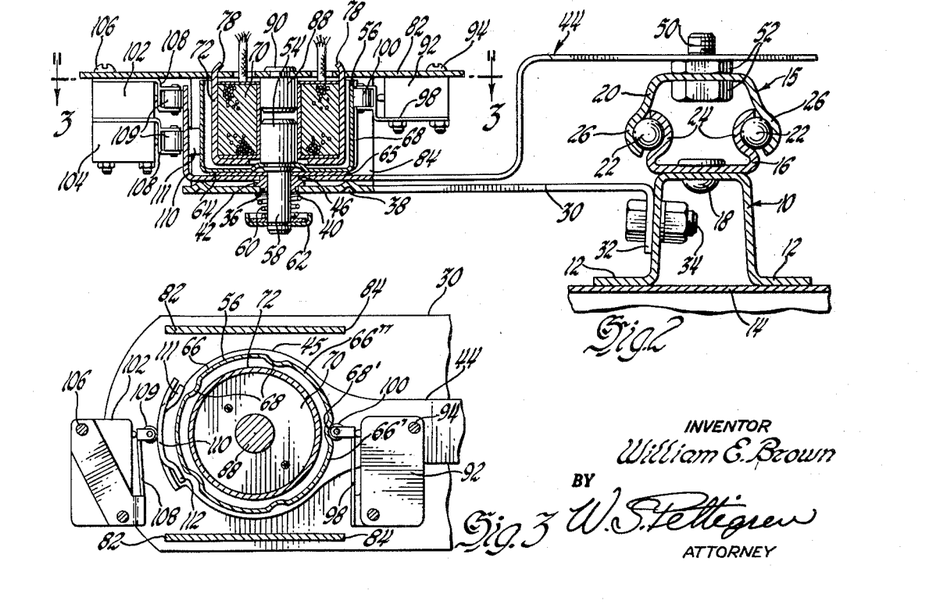
FIGURE 2 is a sectional view taken on the plane indicated by line 2—2 of FIGURE 1.
FIGURE 3 is a sectional view taken on the plane indicated by line 3—3 of FIGURE 2.

As previously mentioned, the mechanism of this invention includes a seat control unit which may be used in each embodiment of the invention, and therefore may be mass produced for use in various vehicle body styles. The control unit is shown in FIGURES 1 through 3 of the drawings and will now be described.

A generally channel-shaped downwardly opening seat support bracket 10 includes opposite lateral extending flanges 12 which are welded or otherwise secured to the vehicle floor pan 14. Bracket 10 supports the lower channel-shaped member 16 of a seat slide structure 15 and is secured to member 16 at 18 by riveting or otherwise. The upper channel-shaped member 20 of the seat slide structure surrounds the lower member 16 and a number of ball bearings 22 are provided between the opposing arcuate flanges 24 and 26 of members 16 and 20, respectively, to slidably support the upper member on the lower member. The vehicle seat, not shown, is secured to member 20 in a suitable manner for movement therewith. Although seat slide structures of this type are in common commercial usage, it will be understood that other seat slide structures may be used with equal success.

In the usual vehicle front seat, one of these seat slide structures is provided at each side of the seat to slidably support the seat on the vehicle floor pan for horizontal movement in both forward and rearward directions relative thereto. In certain common seat adjusting mechanisms the seat may also be adjusted vertically through the use of suitable linkage arrangements or otherwise which are supported on the upper channel member 20 and connected to the seat or which are supported on the vehicle floor pan 14 and support the lower channel member 16 with the upper channel member 20 being connected to the seat. As will be understood from the further description in the specification, the seat positioning mechanism of this invention may be used with manually controlled power operated horizontally movable vehicle front seats regardless of whether the front seat is or is not vertically adjustable, and therefore the showing of the seat slide structure 15 in FIGURES 1 and 2 of the drawings is merely for purposes of understanding rather than for purposes of limitation.

A bracket 30 has an offset leg 32 at one end thereof bolted at 34 to one of the walls of bracket 10 and includes a circular opening 36 adjacent the other end thereof, with a concentric upwardly extending circular rib 38 surrounding the opening. A shouldered bushing 40 has one end thereof slidably and rotatably mounted within the opening 36, with the intermediate annular flange 42 of the bushing bearing against the upper surface of bracket 30 immediately adjacent opening 36.

An offset arm 44 includes an opening 46 adjacent the annularly shaped one end 45 thereof which is slidably and rotatably received by the other end of bushing 40. The other end of the arm includes a slot 48 which slidably receives a stud 50 secured in a suitable manner as by nuts 52 to the upper member 20 of the seat slide structure 15. It can be seen that whenever the upper channel member 20 slides relative to the lower channel member 16, the arm 44 will be swung about the bushing 40. A solenoid armature 54 is secured to the base of a generally cup-shaped member 56 and includes a depending stud 58 slidably and rotatably received by the bushing 40. A coil compression spring 60 surrounds the stud 58, with one end thereof engaging the bracket 30 and the other end thereof engaging a removable seat 62 secured to the stud so as to bias the base 64 of member 56 into engagement with a friction washer 65 located between base 64 of member 56 and arm 44 and also bias arm 44 into engagement with the circular rib 38 of bracket 30. Member 56 includes five vertically extending lobes 66 which are separated by vertical grooves 68, as may be seen particularly in FIGURE 3 of the drawings.

A solenoid coil 70 is fixedly mounted within a cup 72 and includes a central bore which slidably receives the armature 54. The cup 72 includes a plurality of tangs 78 which are received within openings 80 of plate 82 and are thereafter bent over so as to secure the solenoid coil to the plate. Plate 82 includes a pair of opposite depending legs 84 which are secured to bracket 30 in a suitable manner at their lower extremities so as to locate the plate 82. A stop 88 is rigidly secured to plate 82 by peening over one end 90 of the stop.

Referring now particularly to FIGURES 2 and 3 of the drawings, a normally open memory limit switch 92 is secured at 94 to plate 82 and the plunger of the switch is operated by a spring arm 98 mounted on the switch housing and having a roller 100 normally fitting within one of the grooves 68' of cup 56. A pair of vertically stacked normally closed front and rear limit switches 102 and 104, respectively, are secured at 106 to plate 82 and the plungers of the switches are each operated by a spring arm 108 secured to the switch housing and mounting a roller 109. As may be seen particularly in FIGURES 2 and 3 of the drawings, arm 44 includes a vertically arcuate leg 110 which normally engages the rollers 109 of switches 102 and 104 with opposite vertical edges of the leg being offset at 111 and 112 for a purpose to be hereinafter described.

Figure 4:
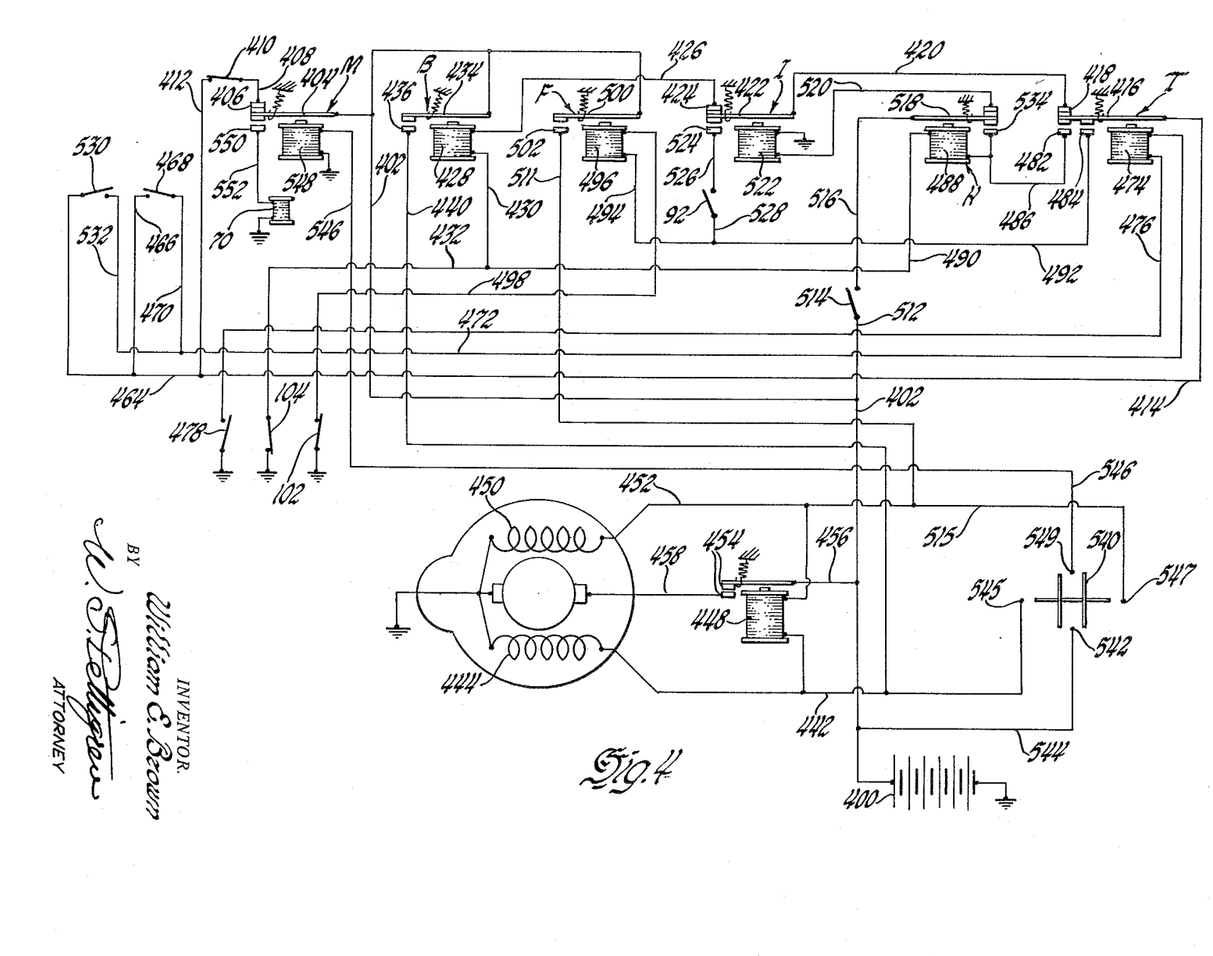
FIGURE 4 is a circuit diagram showing one embodiment of the invention for use in two door vehicle body styles.
Figure 5:
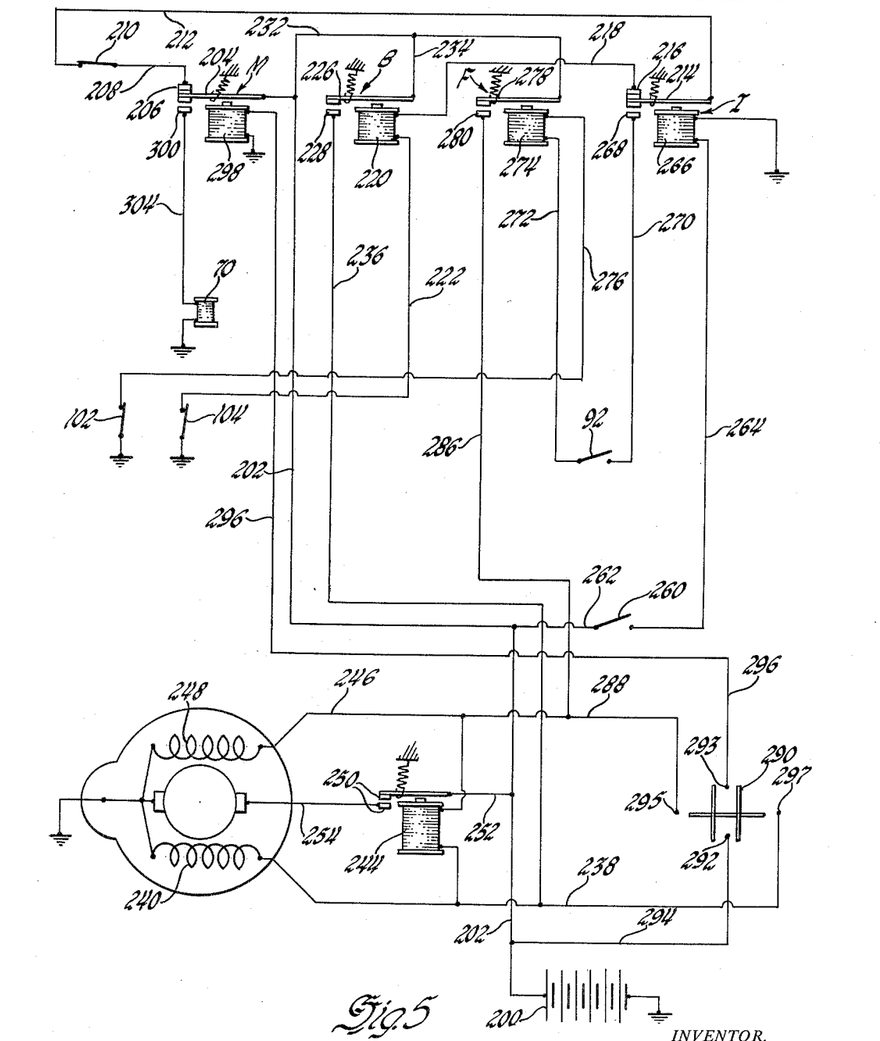
FIGURE 5 is a circuit diagram showing another embodiment of this invention for use in four door vehicle body styles.

Before proceeding with a description of the circuit diagrams of FIGURES 4 and 5, it is believed best that a brief description be given of the operation of the control unit independently of these diagrams. Upon reference to FIGURE 1 of the drawings, it will be noted that arm 44 is shown in three positions, a full line position 44 which is the position of the arm corresponding to the position of the seat midway between its forward and rearward limit positions, and which will be hereinafter referred to as the manually selected or initial starting position of the seat for purposes of description only; a dot-dash position 44A which is the position of the arm corresponding to the rear limit position of the seat; and a dot-dash position 44B which is the position of the arm corresponding to the forward limit position of the seat. It will also be remembered that the cup-shaped member 56 will normally turn with the arm 44 due to the engagement of the base 64 of this member with the friction washer 65 and the engagement of the friction washer 65 with arm 44, both under the action of the compression spring 60.

Assuming first that the seat is under the control of the seat positioning mechanism and is being moved rearwardly from its manually selected or initial starting position to its rear limit position, the arm 44 will be swung counterclockwise from its position 44 to its position 44A as member 20 slides rearwardly of member 16. The cup-shaped member 56 will rotate in the same direction with the arm so that the roller 100 of the memory limit switch 92 will move out of groove 68' and on to lobe 66' of member 56 to close switch 92. Lobe 66' is arranged with a circumferential extent such that it is impossible for the roller 100 to move into the next succeeding groove 68 to open the switch 92 when arm 44 is moved to its position 44A. In addition, as the arm swings in this direction, the arcuate leg 110 of the arm will move past the rollers 109 of the forward and rearward limit switches 102 and 104. When the arm reaches its position 44A, the roller 109 of the rear limit switch 104 will move into the offset 111 to open this switch while the roller 109 of the forward limit switch 102 will remain on the arcuate leg so that this switch remains closed. Thereafter, when the seat positioning mechanism causes the seat to be moved horizontally forwardly from its rear limit position to its manually selected or initial starting position, arm 44 will swing clockwise from its position 44A to its position 44. The cup-shaped member 56 will turn in the same direction with the arm so that the roller 100 of the memory limit switch will move off of lobe 66' and again into engagement with groove 68' to open the switch. The roller 109 of the rearward limit switch will move out of offset 111 and again on to the arcuate leg 110 to close this switch, while the forward limit switch will remain closed.

Assuming now that the seat is caused to be moved horizontally forwardly by the seat positioning mechanism from its manually selected or initial starting position to its forward limit position. Arm 44 will be swung clockwise from its position 44 to its position 44B as the upper member 20 moves forwardly relative to the lower member 16. As the arm swings in this direction, member 56 will turn in the same direction so that the roller 100 of the memory limit switch 92 will move out of groove 68' and on to lobe 66'' to close the switch. The circumferential extent of lobe 66'' is arranged in a like manner as lobe 66' so that the roller 100 cannot move off of this lobe and into the next succeeding groove 68. The arcuate leg 110 of arm 44 will move past the rollers 109 of the forward and rearward limit switches 102 and 104, and when the arm 44 is in its position 44B, the roller 109 of the forward limit switch 102 will move into offset 112 to open this switch while the roller 109 of the rearward limit switch 104 remains on the arcuate leg so that this switch remains closed. When the seat is thereafter returned by the seat positioning mechanism to its manually selected or initial starting position, arm 44 will be swung counterclockwise from its position 44B to its position 44. As the arm swings in this direction, the roller 100 of memory limit switch 92 will move off of lobe 66″ and into groove 68′ to again open this switch while the roller 109 of the forward limit switch 102 will move out of offset 112 and on to the arcuate leg 110 to again close this switch, while the rearward limit switch 104 remains closed.

While the full line position of arm 44 has been referred to as the manually selected or initial starting position of the seat, and will be so referred to in the succeeding description of the circuit diagrams of FIGURES 4 and 5, it will also be noted that the arm 44 is adjusted relative to the member 56 whenever the seat is moved from one manually selected position to another manually selected position under control of the manually operated seat control switch. Whenever the seat is controlled by the manually operated seat control switch and is moved either forwardly or rearwardly from its one manually selected position to another manually selected position, arm 44 will be swung either clockwise or counterclockwise, as previously mentioned. However, whenever the manually operated seat control switch is operated, the solenoid coil 70 is energized to move the solenoid armature 54 upwardly within the coil until it engages the stop 88. This causes member 56 to be moved upwardly out of engagement with the friction washer 66 so that arm 44 will be rotated relative to the member 56 while the member 56 remains stationary and the roller 100 of the memory limit switch 92 remains within groove 68′ so that the switch remains normally open. When the seat has reached its new manually selected position and the operator releases the manually operated seat control switch, solenoid coil 70 is deenergized so that the member 56 again returns into engagement with the friction washer 66 under the action of spring 69 whereby the member 56 and arm 44 again rotates together whenever the seat is thereafter controlled by the seat positioning mechanism. Of course, the forward and rearward limit switches 102 and 104 will be opened and closed as the seat is moved to and from its forward and rearward limit positions under control of the manually operated seat control switch.

Referring now particularly to FIGURE 4 of the drawings, one embodiment of this invention for use in two door body styles will be described.

I. When the ignition switch is "off,"
(a) The front seat is moved rearwardly from its selected or initial starting position to its rear limit position for easy exit from or entrance to the front seat. This will now be described.

A circuit is completed from the battery 400, conductor 402, the armature 404 of relay M, contact 406 of the relay, conductor 408, across the normally closed automatic operation cutoff switch 410, conductor 412, conductor 414, the armature 416 of relay T, contact 418 of the relay, conductor 420, the armature 422 of relay I, contact 424 of the relay, conductor 426, the coil 428 of relay B, conductor 430, conductor 432 and to ground across the normally closed rear limit switch 104. This will energize relay B and the relay armature 434 will be closed to contact 436. Closure of armature 434 to contact 436 will complete a circuit from battery 400 to the armature and contact through conductor 402. A circuit is completed from contact 436 to conductor 440, conductor 442 and to ground across the rearward field winding 444 of the seat motor. A circuit will also be completed across the coil 448 of the motor control relay to ground across the forward field winding 450 of the motor and conductor 452 to energize the relay and close the relay contacts 454. This completes a circuit from conductor 402 to ground across the armature of the motor through conductors 456 and 458. Thus, the rearward field winding of the motor will be energized as well as the armature and the seat will move rearwardly.

Referring now particularly to FIGURES 1 through 3 of the drawings, as the seat moves rearwardly, member 20 will slide rearwardly of member 16 to swing arm 44 in a counterclockwise direction, as viewed in FIGURE 1, from its full line position to its position 44A. As the arm moves in this direction, it will rotate member 56 in the same direction so that the roller 100 of the memory limit switch 92 will ride up and on to lobe 66′ to close the memory limit switch. When the seat reaches its rear limit position, the arcuate leg 110 of the arm will have moved relative to the rollers 109 of the front and rear limit switches 102 and 104 until the roller 109 of switch 104 will move into offset 111 to open this switch. When the rear limit switch is opened, relay B is deenergized to stop the seat motor and thereby stop the seat at its rear limit position.

(b) When the gear shift lever is in park or neutral position, easy exit from or entrance to the rear seat may be had.
  (1) Tilting movement of the front seat back or backs causes the front seat to be moved forward from its selected or initial starting position to forward limit position.
  (2) Restoring the front seat back or backs to normal upright position causes the seat to be moved from its forward limit position to its rear limit position.

This will now be described. When the right hand front seat back is tilted, for example, a circuit is completed from battery 400, conductor 402, the armature 404 of relay M, contact 406 of the relay, conductor 408, switch 410, conductor 412, conductor 464, conductor 466, the now closed right hand seat back switch 468, conductor 470, conductor 472, across the coil 474 of relay T, conductor 476, across the now closed neutral safety switch 478, to ground. Switch 478 is mounted on the steering column and is normally open. The gear shift lever or other transmission control means is operatively connected with this switch so that the switch will be closed whenever the lever or other control means places the transmission in either park or neutral position. This will energize relay T so that the relay armature 416 will be closed to contacts 482 and 484 and will be open to contact 418. Opening of the circuit to contact 418 deenergizes relay B to stop any rearward movement of the seat, if the seat is so moving as described in operation I, so that tilting of the seat back or backs provides an override for rearward movement of the seat, provided, that switch 478 is closed.

Closure of the armature 416 of relay T to contact 482 completes a circuit from the contact to conductor 486, the coil 488 of relay H, conductor 490, conductor 432 to ground across the rear limit switch 104 which is normally closed. This will energize relay H to close the armature 518 of the relay to contact 534. Energization of relay H does not complete any circuit from conductors 512 and 516 since the ignition switch 514 is in "off" position and is normally open. A circuit will be completed from contact 484 to conductor 492, conductor 494, the coil 496 of relay F, conductor 498 to ground across the normally closed forward limit switch 102. This will energize relay F so that the relay armature 500 will be closed to contact 502 to complete a circuit from battery 400 to the contact through conductor 402. A circuit will then be completed from contact 502 to conductor 511 and to ground across the forward field winding 450 of the motor M through conductors 515 and 452 to energize the field winding. The coil 448 of the motor control relay will be energized since a circuit will be completed through the coil to ground across the rearward field winding 444 of the motor to close the relay contacts 454 and complete a circuit to ground across the armature of the motor from conductor 492 across conductors 456 and 458. Thus the seat will be moved forwardly. Referring now particularly to FIGURES 1 through 3 of the drawings, as the seat moves forwardly, the member 20 will slide forwardly relative to the member 16 to swing arm 44 in a clockwise direction. As the arm swings in this direction, it will rotate cup 56 in the same direction so that the roller 109 of the memory limit switch will ride out of groove 68' and on to lobe 66" of the cup to close the switch. When the seat reaches its forward limit position, arm 44 will be in its dot-dash position 44B and the arcuate leg 110 of arm 44 will have moved relative to the rollers 109 of the forward and rearward limit switches until the roller 109 of switch 102 moves into offset 112 to open this switch. When the forward limit switch is opened, relay F will be deenergized to stop the seat motor and thereby stop the seat at its forward limit position.

When the seat back is return to its normal upright position, relay T is deenergized since switch 468 is opened. Thus, the relay armature 416 is again closed to contact 418 to complete the previously described circuit from battery 400, conductor 402, armature 404 of relay M, contact 406 of the relay, conductor 408, switch 410, and conductors 412 and 414 to contact 418. Thereafter, the circuit is completed through conductor 420, armature 422 of relay I, contact 424, conductor 426, the coil 428 of relay B and then to ground through conductors 430 and 432 and the normally closed rear limit switch 104 to energize relay B and in turn complete the circuit to the rearward winding 444 of the motor. The seat will then return to its rear limit position wherein switch 104 will become opened to deenergize relay B and in turn stop the seat motor.

It will be noted that the normally open left hand seat back switch 530 is connected between conductor 464 and conductor 472 by conductor 532 so that regardless of whether the right hand or left hand seat back is tilted forwardly or both, the hereinbefore described seat movement will take place. It is believed obvious that the seat back switches may be mounted in any convenient place for actuation by the front seat backs. Reference may be had to Patent No. 2,829,002, Leavengood et al., issued April 1, 1958, and assigned to the assignee of the present invention, for a showing of one manner of mounting the seat back switches for actuation by the seat backs. It is further believed obvious that if the front seat includes only a single tiltable seat back, then only one of the seat back switches need be used.

II. When the ignition switch is on, (a) Turning the ignition switch on causes the seat to be moved forwardly from its rear limit position to its selected or initial starting position.

As is set forth immediately hereinbefore, whenever the seat is moved to its rear limit position, the cup 56 moves relative to the memory limit switch 92 so that the switch becomes closed as the roller 100 rides out of groove 68' and on to lobe 66' of the cup. Thus, after the hereinbefore set forth cycle of movements, the memory limit switch 92 is in closed position. When the ignition switch 514 is turned on, a circuit is completed from battery 400, conductor 402 through conductor 512, across the now closed ignition switch 514, conductor 516, the armature 518 of relay H, conductor 520, and through the coil 522 of relay I to ground to energize the coil of this relay. The relay armature 422 is then closed to contact 524. This completes a circuit from battery 400, conductor 402, armature 404 of relay M, contact 406, conductor 408, across switch 410, conductor 412, conductor 414, armature 416 of relay T, contact 418 of the relay, conductor 420, to contact 524 through armature 422 of relay I. A further circuit is then completed from contact 524 across conductor 526, across the now closed memory limit switch 92, conductor 528, conductor 494, across the coil 496 of relay F, conductor 498, and then to ground across the normally closed forward limit switch 102. This will energize relay F and close the relay armature 500 to contact 502. This will complete a circuit to the forward field winding 450 of the motor so that the seat will be moved forwardly as previously described.

Referring now particularly to FIGURES 1 through 3 of the drawings, as the seat moves forwardly, member 20 will slide forwardly of member 16 to swing arm 44 in a clockwise direction from its dot-dash position 44A to its full line position 44. As the arm moves in this direction, cup 56 will move with the arm so that the roller 109 of the memory limit switch will ride over lobe 66' and into groove 68' to open the memory limit switch and in turn deenergize relay F to stop the seat motor and thereby stop the seat at its selected or initial starting position.

When the armature 422 of relay I becomes closed to contact 524 and open to contact 424, it will be noted that the circuit through the coil 428 of relay B is broken so that the seat motor cannot be energized to move the seat in a rearward direction when the rear limit switch 104 becomes closed again as arm 44 swings in a clockwise direction to move the roller 109 of the rear limit switch out of the offset 111 and on to the arcuate leg 110 of the arm.

(b) Easy exit or entrance from or to the rear seat with the gear shift lever in park or neutral position
   (1) Tilting of the seat back or backs causes the front seat to be moved forwardly from its rear limit position to its forward limit position
   (2) Restoring the front seat back or backs to normal upright position causes the seat to be moved from its forward limit position to its rear limit position and then to its selected or initial starting position.

Assuming now that the left hand seat back is tilted forwardly. A circuit will be completed from battery 400, conductor 402 across the armature 404 of relay M, contact 406 of the relay, conductor 408, across switch 410, conductor 412, conductor 464, across the now closed left hand seat back switch 530, conductor 532, conductor 472, across the coil 474 of relay T, conductor 476, and then to ground across the switch 478. This will energize relay T to close the relay armature 416 to contacts 482 and 484. A circuit is then completed from battery 400 and conductor 402 to each of these contacts across the armature 404 of relay M, contact 406 of the relay, conductor 408, switch 410, and conductors 412 and 414. Thereafter a circuit is completed from contact 482 through conductor 486, across the coil 488 of relay H, conductor 490, and conductor 432 to ground through the rear limit switch 104. This will energize relay H so that the armature 518 of the relay is closed to contact 534.

Closure of the armature 518 of relay H to contact 534 completes a circuit from battery 400 and conductor 402 across the ignition switch 514 through conductor 512, conductor 516, armature 518, and contact 534, to conductor 486, coil 488 of relay H, and then to ground through conductors 490 and 432 and the rear limit switch 104. A parallel circuit to ground through conductor 430, coil 428 of relay B, conductor 426, contact 424 of relay I, armature 422, conductor 420 and contact 418 is open since relay T is energized.

Closure of armature 416 to contact 484 completes a circuit from the contact through conductor 492, conductor 494, coil 496 of relay F, conductor 498, and then to ground across the forward limit switch 102. This energizes relay F to close the relay armature 500 to contact 502. Closure of armature 500 to contact 502 completes a circuit from battery 400 and conductor 402 to ground across the forward field winding 450 of motor by means of conductors 511, 515 and 452. The coil 448 of the motor control relay is also energized through the rearward field winding 444 of the motor to close the contacts 454 of the relay and in turn energize the armature of the motor through conductors 456 and 458. Thus, the seat moves forwardly.

Referring now to FIGURES 1 through 3 of the drawings, as the seat moves forwardly from its rear limit position to its forward limit position, member 20 slides forwardly of member 16 to swing arm 44 in a clockwise direction from its dot-dash position 44A toward its dot-dash position 44B. As the arm swings in this direction, cup 56 will turn with the arm so that the roller 100 of the memory limit switch will move off of lobe 66' of the cup, into the groove 68' of the cup, and then on to lobe 66'' of the cup. Additionally, the rollers 109 of the forward and rearward limit switches will move along the arcuate leg 110 of the arm so that roller 109 of the rear limit switch will move out of the offset 111 and on to the leg to close this swtich. When arm 44 has moved to its dot-dash position 44B, the roller 109 of the forward limit switch 102 will move into offset 112 to open this switch and thereby deenergize relay F to stop the seat motor and stop the seat at its forward limit position.

When the seat back is returned to its normal upright position, switch 530 is opened to break the circuit from conductor 412 to conductor 464 to deenergize relay T so that the relay armature 416 now returns into engagement with contact 418. The circuit has previously been completed to contact 418 as described in conjunction with relay H, and relay H will remain energized since a feed back circuit is provided through the coil of the relay from the ignition switch. This prevents relay I from being energized through the ignition switch. Closure of the armature 416 to contact 418 completes the circuit from battery 400, conductor 402, the armature 404 of relay M, contact 406, conductor 408, switch 410, conductor 412, conductor 414, across armature 416, contact 418, conductor 420, armature 422 of relay I, contact 424, conductor 426, the coil 428 of relay B, and then to ground across the rear limit switch 104 through conductor 432. This energizes the coil of relay B so that the relay armature 434 is closed to contact 436 to complete a circuit to the rearward field winding of the motor as previously described so that the seat will be moved to its rear limit position.

Referring now particularly to FIGURES 1 through 3 of the drawings, as the seat moves to its rear limit position, member 20 will slide rearwardly of member 16 to swing arm 44 in a counterclockwise direction from its position 44B to its position 44A. As the arm swings in this direction, cup 56 will turn in the same direction with the arm so that the roller 100 of the memory limit switch 92 will move off of lobe 66'' into engagement with groove 68' and then on to lobe 66' to close the switch. Additionally, as the arcuate leg 110 moves relative to the rollers 109 of switches 102 and 104, the roller 109 of the forward limit switch will move out of the offset 112 and on to the arcuate leg to close this switch and the roller of the rearward limit switch 104 will move off of the leg and into the offset 111 to open this switch when the seat reaches its rear limit position. This will deenergize relays B and H to stop the seat motor and also stop the seat at its rear limit position.

Since the switch 92 has become closed during this cycle of movements, the circuit described above in conjunction with H(a) is completed and the seat is returned to its initial starting position.

III. Operation of the seat by the seat positioning mechanism may be overridden at any time by the manually operated seat control switch. The manual seat control switch 540 includes a center hot contact 542 which is always connected to the battery 400 by conductor 544 and 3 contacts, 545, 547, 549. It will be noted that whenever the manual seat control switch is operated to move the seat forward or rearward, the battery 400 is connected to the contact 549 which in turn is connected to conductor 546 which leads to ground across the coil 548 of relay M.

Any energization of relay M breaks the circuit between conductor 402 and conductor 408 so that relays B and F will be deenergized to stop whatever seat movement is taking place. This in turn will deenergize whichever field winding of the motor is energized and will also deenergize the coil of the motor control relay to stop the seat motor.

If the manual control switch is moved to the left to engage contacts 542, 545 and 549, relay M would be energized, as previously described, to move the armature 404 of the relay out of engagement with contact 406 and into engagement with contact 550 to complete a circuit from the battery to ground across armature 404, contact 550, conductor 552 and the solenoid coil 70 of the seat control unit to energize this coil. Additionally, the rearward field winding will be energized from contact 545 and conductor 442, and also the armature of the motor, as previously described, to move the seat in a rearward direction. Movement of the seat in a forward direction is believed clear from the diagram if the switch is moved to the right into engagement with contacts 542, 547 and 549.

In each instance, it will be noted that the solenoid coil 70 of the seat control unit is energized to move cup 56 upwardly out of engagement with arm 44, with reference to FIGURES 1 through 3. Thus as the seat moves, the arm will turn relative to the cup 56 and the cup will remain stationary with respect to the memory limit switch 92. If the roller 100 of the memory limit switch is on either lobe 66' or 66'', release of the manual control switch will operate to deenergize relay M to allow spring 60 to move the cup back into engagement with the friction washer so that the cup is again clutched to arm 44. Additionally, whatever circuit was broken by deenergization of either relay B or relay F will again be completed and the seat will then continue either forward or rearward from the point at which its movement was stopped until the roller 100 of the memory limit switch again returns into engagement with groove 68'. The position at which the seat will stop will not be the selected or initial starting position, but will rather be a new selected position which is in reference to the position of the seat when the manual control switch is operated. Thus, for example, if the seat had a selected or initial starting position 3 inches forward of its rear limit position, had moved forward two inches from its rear limit position under control of the seat positioning mechanism when the manual control switch was operated, and the manual control switch was operated to move the seat back to its rear limit position, the new selected position at which the seat will stop will be one inch forward of its rear limit position since this was the seat travel stored in the seat control unit.

From the foregoing description, it is believed that operation of the seat by the manual control switch is easily apparent. If the seat is not under control of the seat positioning mechanism when the manual switch is operated, then cup 56 will be moved upwardly out of engagement with arm 44 so that the arm will turn relative to the cup and the cup will remain stationary with respect to the memory limit switch 92 so that the roller 100 remains in the groove 68' of the cup. Thus the relative position of the memory limit switch and cup will again define or correspond to the position of the seat when the operator releases the manual control switch so that spring 60 will return the cup into engagement with friction washer 66 to again clutch the cup 56 to arm 44.

IV. The automatic operation cutoff switch will stop automatic seat movement whenever opened. However, the seat may still be adjusted by means of the manually operated seat control switch.

Since the switch 410 is always in the circuit between the battery and relays B and F, any opening of this switch prevents automatic movement of the seat. Since the manual control switch is in a circuit which is entirely different than the circuit including the switch 410, opening of the switch does not affect manual operation of the seat.

Referring now particularly to FIGURE 5 of the drawings, another embodiment of a seat positioning mechanism according to this invention for use in four door vehicle bodies will be described.

I. When the ignition switch is moved to "off" position, the front seat is moved from its manually selected or initial starting position to its rear limit position for easy exit from or easy entrance to the seat. This will now be described.

The circuit is completed from the battery 200, conductor 202, the armature 204 of relay M, relay contact 206 of relay M, conductor 208, the normally closed cutoff switch 210, conductor 212, the armature 214 of relay I, contact 216 of relay I, conductor 218, the coil 220 of relay B, conductor 222 and through the normally closed rear limit switch 104 to ground. This will energize relay B and the armature 226 of the relay will be closed to relay contact 228. This will complete a circuit from battery 220, to conductor 202, through conductors 232 and 234, to the armature 226 of relay B, and contact 228. The circuit from contact 228 is completed through conductors 236 and 238, and through the rearward field winding 240 of the seat motor to ground. At the same time, the coil 244 of the motor control relay will be energized through conductor 246 and the forward field winding 248 of the seat motor to ground to close the relay contacts 250 and complete a circuit to ground through the armature of the motor and conductors 252 and 254. Thus, the seat will be moved rearwardly.

Referring now particularly to FIGURES 1 through 3 of the drawings, as the seat is moved rearwardly from its selected or initial starting position to its rear limit position, the member 20 slides rearwardly of the member 16 to swing arm 44 in a counterclockwise direction, as viewed in FIGURE 1. As the arm swings in this direction, it will rotate the cup 56 in the same direction so that the roller 100 of the memory limit switch 92 will move out of groove 68' and on to lobe 66' of the cup to close the memory limit switch. At the same time, the arcuate leg 110 of arm 44 moves relative to the rollers 109 of the forward and rearward limit switches 102 and 104, respectively. When the seat has been moved to its rear limit position, arm 44 will be located in its dot-dash position 44A, FIGURE 1. When the arm is in this position, the roller 109 of the rear limit switch 104 will have moved into the offset 111 to open this switch and deenergize the coil 220 of relay B to stop the seat motor M and thereby stop the seat at its rear limit position. The forward limit switch will remain closed, as previously explained.

II. When the ignition switch is subsequently turned "on," the seat will be returned from its rear limit position to its selected or initial starting position. This will now be described.

When the ignition switch 260 is closed, a circuit is completed from battery 200, conductor 202, through conductors 262 and 264 to ground across the coil 266 of relay I to energize the relay. This will complete a circuit from battery 200, conductor 202, the armature 204 of relay M, relay contact 206, conductor 208, the normally closed switch 210, conductor 212, armature 214 of relay I, relay contact 268, conductor 270, the now closed memory limit switch 92, conductor 272, the coil 274 of relay F, and conductor 276 to ground through the normally closed forward limit switch 102. Relay F will thus be energized and the armature 278 of the relay will be closed to relay contact 280. A circuit will be completed from the battery 200 to the relay armature 278 and the relay contact 280 through conductors 202 and 232. The circuit from contact 280 is completed through conductors 286, 288 and 246 to ground across the forward field windings 248 of motor M. At the same time, the coil 244 of the motor control relay is energized through the rearward field winding 240 to close the relay contacts 250 and complete a circuit through the armature of the motor to ground through the conductors 252 and 254. The seat will thus be moved forwardly.

Referring now particularly to FIGURES 1 through 3 of the drawings, as the seat is moved forwardly from its rear limit position to its selected or initial starting position, member 20 will slide forwardly of member 16 to swing arm 44 in a clockwise direction from its dot-dash position 44A to its full line position 44, as viewed in FIGURE 1. As the arm swings in this direction, the arcuate leg 110 of the arm will move relative to the roller 109 of switch 104 to again close this switch. The member 56 will be moved in the same direction with arm 44 until roller 100 of the memory limit switch has moved along lobe 66' and again into groove 68' to open the memory limit switch 92 and thereby deenergize relay F to stop the seat motor and stop the seat at its selected or initial starting position.

III. Operation of the seat by the seat positioning mechanism may be overridden at any time by the manually operated seat control switch. This will now be described.

The manually operated seat control switch 290 includes a center hot contact 292, always connected to the battery 200 through conductor 294, and three other contacts 293, 295 and 297. Assuming now that the seat is moving forwardly as previously described in conjunction with operation II and the operator desires to move the seat rearwardly, the manually operated seat control switch will be closed from the hot contact 292 to contacts 293 and 297. Closure of the switch to contact 297 energizes the rearward field winding 240 of the motor M through conductor 238 and also energizes the armature of the motor through the forward field winding 248 as previously described. Closure of the switch to contact 293 will complete a circuit from this contact through conductor 296 to ground across the coil 298 of relay M to energize the relay. When relay M is energized, the relay armature 204 is closed to contact 300 to deenergize relay F and deenergize the forward winding 248 of motor M.

Closure of the armature 204 of relay M to contact 300 completes a circuit from battery 200 through conductor 202 to the armature 204 and the contact 300. A circuit is completed from contact 300 through conductor 304 and the solenoid coil 70 of the seat control unit to ground to energize this solenoid coil. Thus, the seat will be moved rearward.

It will be remembered that the forward movement of the seat was stopped at a point wherein the roller 100 of the memory limit switch 92 was still on lobe 66' of cup 56 so that switch 92 was closed, and that the cup 56 remained stationary with respect to switch 92 during rearward movement of the seat since the solenoid coil 70 was energized. Thus, the switch 92 is still closed regardless of the fact that the seat has moved rearward. Therefore, as soon as the operator releases the manual control switch to deenergize the solenoid coil 70 and relay M, relay F will again be energized and the seat will again start to move forward until the switch 92 again becomes normally open when the roller 100 again fits within the groove 68' of cup 56 to stop the seat at a new position. However, this new position of the seat will not be the same as the original selected or initial starting position of the seat since the seat started forward movement from a position which was rearward of its position when the manual control switch was operated. For example, suppose that the original selected or initial starting position of the seat was 3 inches forward of its rear limit position. Containing, suppose that the seat has moved 1 inch forward of its rear limit position under control of the seat positioning mechanism when the operator actuated the manual control switch 290 to move the seat back to its rear limit position. Thus, the seat still has 2 inches of travel stored in the seat control unit and, when the seat again starts to move forward from its rear limit position upon release of the manual control switch, the seat will stop at the new position 2 inches forward of its rear limit position rather than the original selected or initial starting position 3 inches forward of the rear limit position.

If the operator uses the manual control switch to move the seat forwardly rather than rearwardly, the operation will be the same. Thus, the point at which the driver releases the manual control switch is the new starting position of the seat under control of the seat positioning mechanism and any seat travel distance stored in the seat control unit will thereafter be used up with reference to this new starting position of the seat.

If the seat is moved rearwardly, as previously described in conjunction with operation I, and the operator operates the manually operated seat control switch to move the seat forwardly, the operation of the seat positioning mechanism will be substantially the same as hereinbefore described. Since the manual control switch is always closed to contact 293 regardless of whether the switch is operated to move the seat forwardly or rearwardly, relay M will always be energized whenever the manual control switch is operated.

Although the manual control switch provides an override at any time during operation of the seat under control of the seat positioning mechanism, this is more of a safety feature than anything else since it prevents the seat from crushing the driver against the steering wheel if he happens to sit within the seat and turn the ignition switch "on" preparatory to starting the car and also happens to be of a different size, for example, than the previous driver.

IV. The cutoff switch will always stop operation of the seat by the seat positioning mechanism when opened. However, the seat may still be adjusted by means of the manually operated seat control switch. This will now be described.

The cutoff switch 210 is always in the circuit between conductors 208 and 212 and is thus always in the circuit between the battery 200 and relays B and F. Thus, any opening of this switch will always deenergize these relays to stop either forward or rearward seat movement. From the description with respect to operation III above, it can be seen that the switch 210 is never in the circuit when the manual seat control switch 290 is operated since the armature 204 of relay M is closed to contact 300 in such instance rather than contact 206.

V. From the description under operation III, it is believed that the operation of the manual seat control switch 290 is easily apparent. Whenever the switch is operated to move the seat either horizontally forwardly or rearwardly, relay M is energized through switch 293 to energize the solenoid coil 70 of the seat control unit. Whenever the solenoid 70 is energized, as previously described, cup 56 is moved upwardly out of engagement with the friction washer 66 so that the cup remains stationary with respect to memory limit switch 92 while arm 44 will turn in either direction with respect to the cup. Thus the relative position of the cup and memory limit switch remain stationary and will define or correspond to the new manually selected position of the seat. Upon release of the manual control switch, relay M is deenergized and the solenoid coil 70 is also deenergized so that the spring 60 will again return the cup 56 into engagement with the friction washer 66.

Thus this invention provides a new and improved vehicle seat positioning mechanism to facilitate exit and entrance of the vehicle driver and passengers.

I claim:

1. The combination comprising, support means, a seat mounted on said support means for displacement between a selected position and a predetermined position, power operating means for so displacing said seat, a source of power, stationary control means connected with said source of power, rotatable control means having a predetermined rotative position with respect to said stationary means defining said selected seat position, means operative upon displacement of said seat from said selected position to said predetermined position for rotating said rotatable means to another rotative position with respect to said stationary means defining said predetermined seat position, and control means for actuating said power operating means, said control means including said stationary means and being energized through said stationary means upon movement of said rotatable means to said another position with respect thereto to actuate said power operating means to displace said seat from said predetermined seat position to said selected seat position.

2. The combination comprising, support means, a seat mounted on said support means for displacement between a plurality of selected positions and a predetermined position, power operating means for so displacing said seat, a source of power, stationary control means connected with said source of power, rotatable control means having a predetermined rotative position with respect to said stationary means defining any one of said plurality of selected seat positions, means operative upon displacement of said seat from a selected any one of said plurality of selected positions to said predetermined position for rotating said rotatable means to another rotative position with respect to said stationary means defining said predetermined seat position, and control means for actuating said power operating means, said control means including said stationary means and being energized through said stationary means upon movement of said rotatable means to said another position with respect thereto to actuate said power operating means to displace said seat from said predetermined seat position to said selected any one of said selected seat positions.

3. The combination comprising, support means, a seat mounted on said support means for displacement between a selected position and a predetermined position, power operating means for so displacing said seat, a source of power, stationary control means connected with said source of power, rotatable control means having a predetermined rotative position with respect to said stationary means defining said selected seat position, means operative upon displacement of said seat from said selected position to said predetermined position for rotating said rotatable means to another rotative position with respect to said stationary means defining said predetermined seat position, and control means including said stationary means for actuating said power operating means, said control means being deenergized through said stationary means when said rotatable control means is in said predetermined rotative position with respect thereto and being energized through said stationary control means upon movement of said rotatable means to said another position with respect thereto to actuate said power operating means to displace said seat from said predetermined seat position to said selected seat position.

4. The combination comprising, support means, a seat mounted on said support means for displacement between a selected position and a predetermined position, power operating means for so displacing said seat, a source of power, stationary control means connected with said source of power, rotatable control means having a predetermined rotative position with respect to said stationary means defining said selected seat position, means operative upon displacement of said seat from said selected position to said predetermined position for rotating said rotatable means to another rotative position with respect to said stationary means defining said predetermined seat position, and control means for actuating said power operating means, said control means including said stationary means and being energized through said stationary means upon movement of said rotatable means to said another position with respect thereto to actuate said power operating means to displace said seat from said predetermined seat position to said selected seat position, and additional control means for actuating said power operating means to displace said seat from said selected position to another selected position and including means for retaining said rotatable control means in said predetermined rotative position thereof with respect to said stationary means during displacement of said seat between said selected positions.

5. The combination comprising, support means, a seat mounted on said support means for displacement between a plurality of selected positions and a predetermined position, power operating means for so displacing said seat, a source of power, stationary control means connected with said source of power, rotatable control means having a predetermined rotative position with respect to said stationary means defining any one of said selected seat positions, means normally operative upon displacement of said seat from said selected position to said predetermined position for rotating said rotatable means to another rotative position with respect to said stationary means defining said predetermined seat position, control means for actuating said power operating means, said control means including said stationary means and being energized through said stationary means upon movement of said rotatable means to said another position with respect thereto to actuate said power operating means to displace said seat from said predetermined seat position to said any one of said selected seat positions, and selectively and alternatively operable additional control means for actuating said power operating means to displace said seat from said selected position to another of said plurality of selected positions and including means for retaining said rotatable control means in said predetermined rotative position thereof with respect to said stationary means during displacement of said seat between said selected positions.

6. The combination comprising, support means, a seat mounted on said support means for displacement between a plurality of selected positions and a predetermined position, power operating means for so displacing said seat, a source of power, stationary control means connected with said source of power, rotatable control means having a predetermined rotative position with respect to said stationary means defining any one of said selected seat positions, means normally operative upon displacement of said seat from said selected position to said predetermined position for rotating said rotatable means to another rotative position with respect to said stationary means defining said predetermined seat position, control means for actuating said power operating means, said control means including said stationary means and being energized through said stationary means upon movement of said rotatable means to said another position with respect thereto to actuate said power operating means to displace said seat from said predetermined seat position to said any one of said selected seat positions, and additional control means for actuating said power operating means to displace said seat from said selected position to said predetermined position and including means for retaining said rotatable control means in said predetermined rotative position thereof with respect to said stationary means during displacement of said seat between said selected and predetermined positions.

7. The combination comprising, support means, a seat mounted on said support means for displacement between a plurality of selected positions and a predetermined position, power operating means for so displacing said seat, a source of power, stationary control means connected with said source of power, rotatable control means having a predetermined rotative position with respect to said stationary means defining any one of said selected seat positions, means normally operative upon displacement of said seat from said selected position to said predetermined position for rotating said rotatable means to another rotative position with respect to said stationary means defining said predetermined seat position, control means for actuating said power operating means, said control means including said stationary means and being energized through said stationary means upon movement of said rotatable means to said another position with respect thereto to actuate said power operating means to displace said seat from said predetermined seat position to said any one of said selected seat positions, and additional control means for actuating said power operating means to displace said seat from said selected position to another of said plurality of selected positions and from said another selected position to a further of said plurality of selected positions and including means for retaining said rotatable control means in said predetermined rotative position thereof with respect to said stationary means during displacement of said seat between said any one, another, and further selected positions.

8. The combination comprising, support means, a seat mounted on said support means for displacement between a selected position and a predetermined position, power operating means for so displacing said seat, a source of power, stationary switch means connected with said source of power, rotatable switch operating means having a predetermined rotative position with respect to said stationary switch means defining said selected seat position, means operative upon displacement of said seat for rotating said switch operating means to another rotative position with respect to said stationary switch means defining said predetermined seat position, and control means for actuating said power operating means, said control means including said stationary switch means and being energized through said stationary switch means upon movement of said switch operating means to said another position with respect thereto to actuate said power operating means to displace said seat from said predetermined seat position to said selected seat position.

9. The combination comprising, support means, a seat mounted on said support means for displacement between a selected position and a predetermined position, power operating means for so displacing said seat, a source of power, stationary switch means connected with said source of power, rotatable switch operating means having a predetermined non-operative rotative position with respect to said stationary switch means defining said selected seat position, means operative upon displacement of said seat for rotating said rotatable means to an operative rotative position with respect to said stationary switch means defining said predetermined seat position, and control means for actuating said power operating means, said control means including said stationary switch means and being energized through said stationary switch means upon movement of said rotatable means to said operative position to actuate said power operating means to displace said seat from said predetermined seat position to said selected seat position.

10. The combination comprising, support means, a seat mounted on said support means for displacement between a plurality of selected positions and a predetermined position, power operating means for so displacing said seat, a source of power, stationary switch means connected with said source of power, rotatable control means having a predetermined non-operative rotative position with respect to said switch means defining any one of said selected seat positions, means operative upon displacement of said seat from said selected position to said predetermined position for rotating said rotatable means to an operative rotative position with respect to said switch means defining said predetermined seat position, and control circuit means for actuating said power operating means, said control circuit means including said switch means and being energized through said switch means upon movement of said rotatable means to said operative position to actuate said power operating means to displace said seat from said predetermined seat position to said any one of said selected seat positions.

11. The combination comprising, support means, a seat mounted on said support means for displacement between a selected position and a predetermined position, power operating means for so displacing said seat, a support, a source of power, stationary switch means connected with said source of power and mounted on said support, rotatable switch operating means mounted on said support and having a predetermined rotative position with respect to said switch means defining said selected seat position, means operatively interconnecting said switch operating means and said seat and operative upon displacement of said seat from said selected position to said predetermined position for rotating said switch operating means to an operative rotative position with respect to said stationary switch means defining said predetermined seat position, and control means for actuating said power operating means, said control means including said stationary switch means and being energized through said stationary switch means upon movement of said rotatable means to said operative position to actuate said power operating means to displace said seat from said predetermined seat position to said selected seat position.

12. The combination comprising, support means, a seat mounted on said support means for displacement between a selected position and a predetermined position, power operating means for so displacing said seat, a support, a source of power, switch means connected with said source of power and mounted on said support, rotatable switch operating means mounted on said support and having a predetermined non-operative rotative position with respect to said switch means defining said selected seat position, a control arm swingably mounted on said support and operatively connected to said seat, friction clutch means normally operative to clutch said switch operating means to said arm for rotating said switch operating means to an operative rotative position with respect to said switch means defining said predetermined seat position upon displacement of said seat from said selected position to said predetermined position, and control circuit means for actuating said power operating means, said control circuit means including said switch means and being energized through said switch means upon movement of said switch operating means to said operative position with respect thereto to actuate said power operating means to displace said seat from said predetermined seat position to said selected seat position.

13. The combination comprising, support means, a seat mounted on said support means for displacement between a selected position and a predetermined position, power operating means for so displacing said seat, a support, a source of power, switch means connected with said source of power and mounted on said support, rotatable switch operating means mounted on said support and having a predetermined non-operative rotative position with respect to said switch means defining said selected seat position, a control arm swingably mounted on said support and operatively connected to said seat, friction clutch means normally operative to clutch said switch operating means to said arm for rotating said switch operating means to an operative rotative position with respect to said switch means defining said predetermined seat position upon displacement of said seat from said selected position to said predetermined position, control circuit means for actuating said power operating means, said control circuit means including said switch means and being energized through said switch means upon movement of said switch operating means to said operative position with respect to said switch means to actuate said power operating means to displace said seat from said predetermined seat position to said selected seat position, and additional control circuit means for actuating said power operating means to displace said seat from said selected seat position to said predetermined seat position and including means for retaining said switch operating means in said non-operative rotative position with respect to said switch means during displacement of said seat between said selected and predetermined positions.

References Cited in the file of this patent
UNITED STATES PATENTS

| | | |
|---|---|---|
| 2,823,949 | Williams et al. | Feb. 18, 1958 |
| 2,829,002 | Leavengood et al. | Apr. 1, 1958 |

UNITED STATES PATENT OFFICE
CERTIFICATE OF CORRECTION

Patent No. 3,115,328                      December 24, 1963

William E. Brown

It is hereby certified that error appears in the above numbered patent requiring correction and that the said Letters Patent should read as corrected below.

Column 7, line 19, for "return" read -- returned --; column 11, line 19, for "220" read -- 200 --; column 12, line 67, for "Containing" read -- Continuing --; same line 67, for "has" read -- had --; column 13, line 49, after "switch" insert -- contact --; column 14, line 62, after "means", second occurrence, insert -- normally --.

Signed and sealed this 26th day of May 1964.

(SEAL)
Attest:

ERNEST W. SWIDER                    EDWARD J. BRENNER
Attesting Officer                    Commissioner of Patents